(No Model.) 7 Sheets—Sheet 1.
C. B. HOPKINS.
CASH INDICATOR AND REGISTER.

No. 457,199. Patented Aug. 4, 1891.

Witnesses:
Jas. E. Hutchinson.
Henry C. Hazard.

Inventor.
Cabel B. Hopkins
by Prindle & Russell
his Attorneys (No Model.) 7 Sheets—Sheet 2.
C. B. HOPKINS.
CASH INDICATOR AND REGISTER.

No. 457,199. Patented Aug. 4, 1891.

Witnesses:
Jas. E. Hutchinson.
Henry C. Hazard.

Inventor
Cabel B. Hopkins
by Prindle & Russell
his Attorneys (No Model.) 7 Sheets—Sheet 3.
C. B. HOPKINS.
CASH INDICATOR AND REGISTER.

No. 457,199. Patented Aug. 4, 1891.

Witnesses:
Jas. E. Hutchinson.
Henry C. Hazard.

Inventor
Cebre B. Hopkins
by Pamelee and Russell
his attorneys (No Model.) 7 Sheets—Sheet 4.

C. B. HOPKINS.
CASH INDICATOR AND REGISTER.

No. 457,199. Patented Aug. 4, 1891.

Witnesses:
Jas. E. Hutchinson.
Henry C. Hazard.

Inventor
Cabel B. Hopkins
by Prindle and Russell
his attorneys (No Model.) 7 Sheets—Sheet 6.
C. B. HOPKINS.
CASH INDICATOR AND REGISTER.

No. 457,199. Patented Aug. 4, 1891.

Witnesses:
Jas. E. Hutchinson
Henry C. Hazard

Inventor:
Cabel B. Hopkins
by Prindle & Russell
his attorneys (No Model.) 7 Sheets—Sheet 7.
C. B. HOPKINS.
CASH INDICATOR AND REGISTER.
No. 457,199. Patented Aug. 4, 1891.
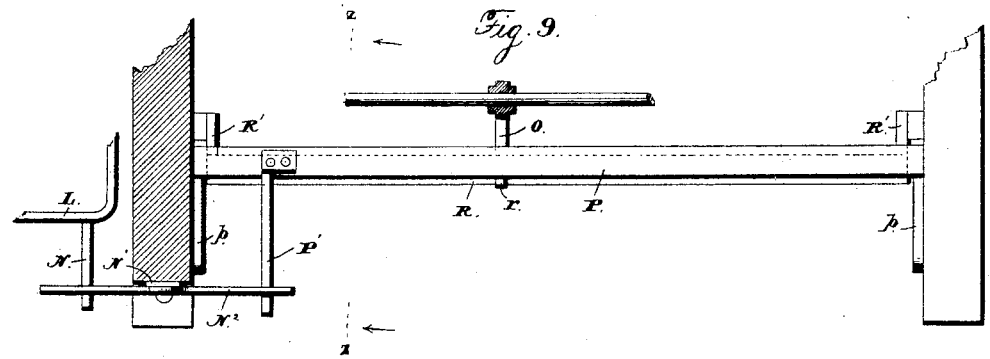
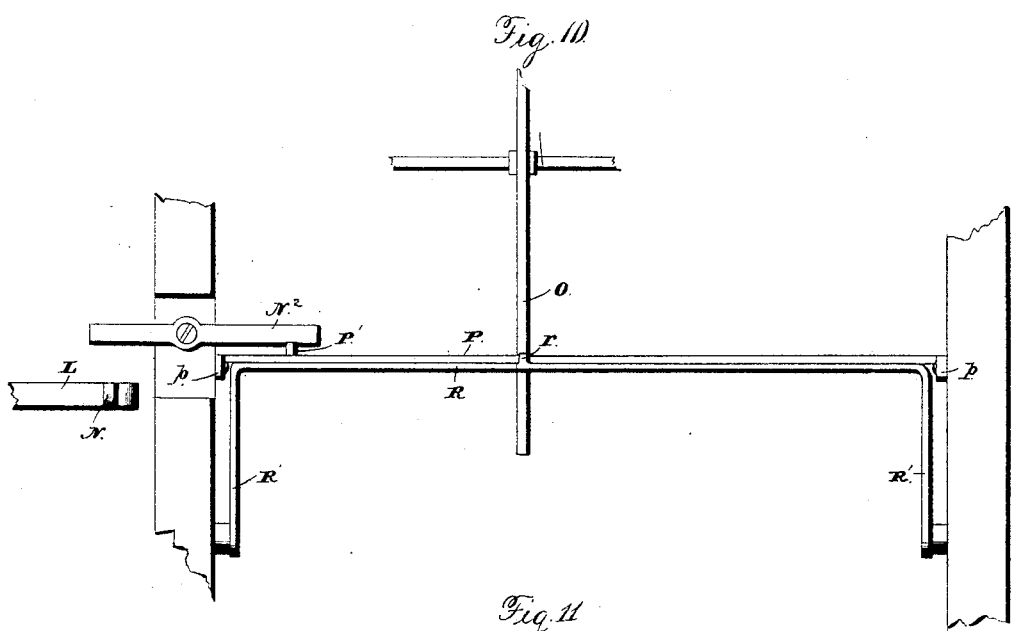
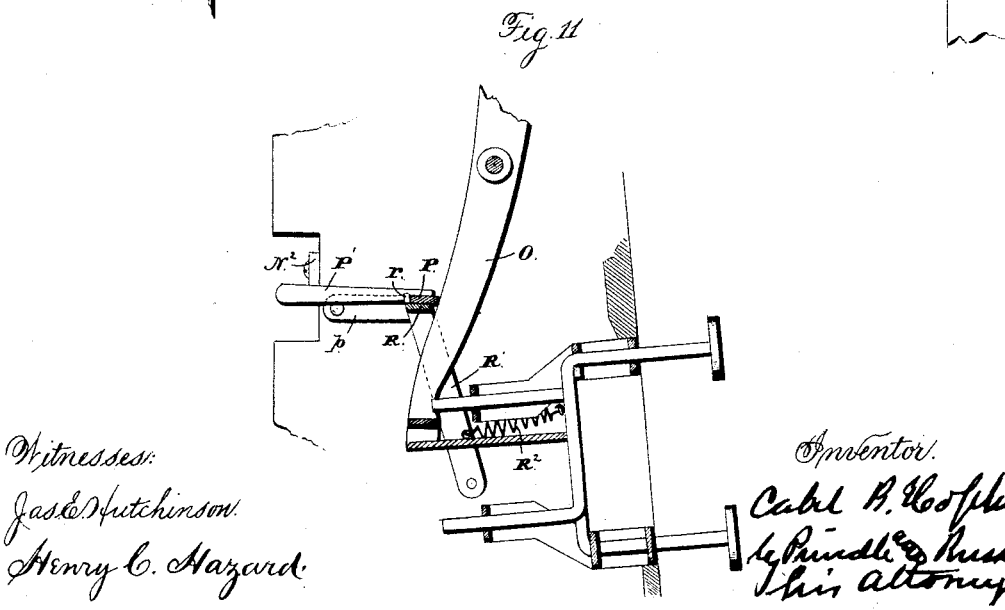
Witnesses:
Jas. E. Hutchinson.
Henry C. Hazard.
Inventor.
Cabel B. Hopkins
by Prindle & Russell
his attorneys

UNITED STATES PATENT OFFICE.

CABEL B. HOPKINS, OF LOUISVILLE, KENTUCKY, ASSIGNOR TO THE HOPKINS & ROBINSON MANUFACTURING COMPANY, OF SAME PLACE.

CASH INDICATOR AND REGISTER.

SPECIFICATION forming part of Letters Patent No. 457,199, dated August 4, 1891.

Application filed February 19, 1889. Renewed June 16, 1891. Serial No. 396,411. (No model.)

*To all whom it may concern:*

Be it known that I, CABEL B. HOPKINS, of Louisville, in the county of Jefferson, and in the State of Kentucky, have invented certain new and useful Improvements in Cash Indicating and Registering Mechanism; and I do hereby declare that the following is a full, clear, and exact description thereof, reference being had to the accompanying drawings, in which—

Figure 1:
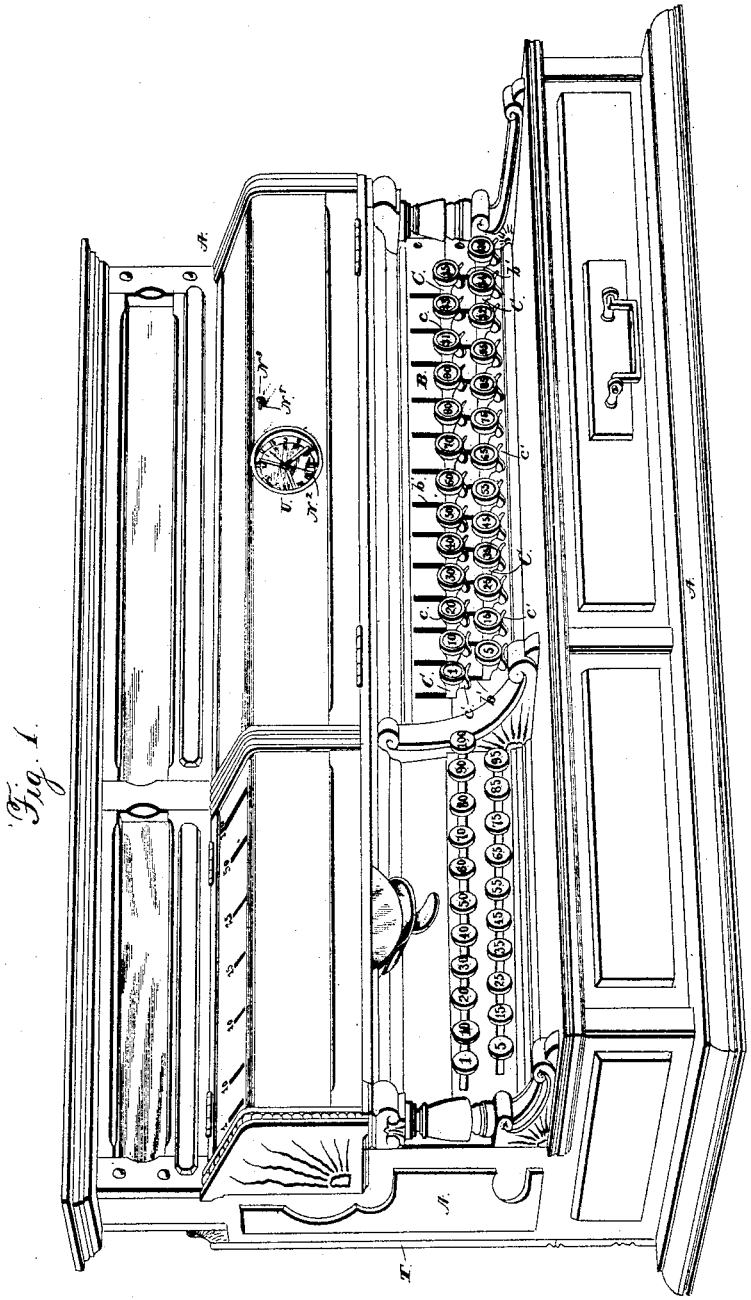
Figure 2:
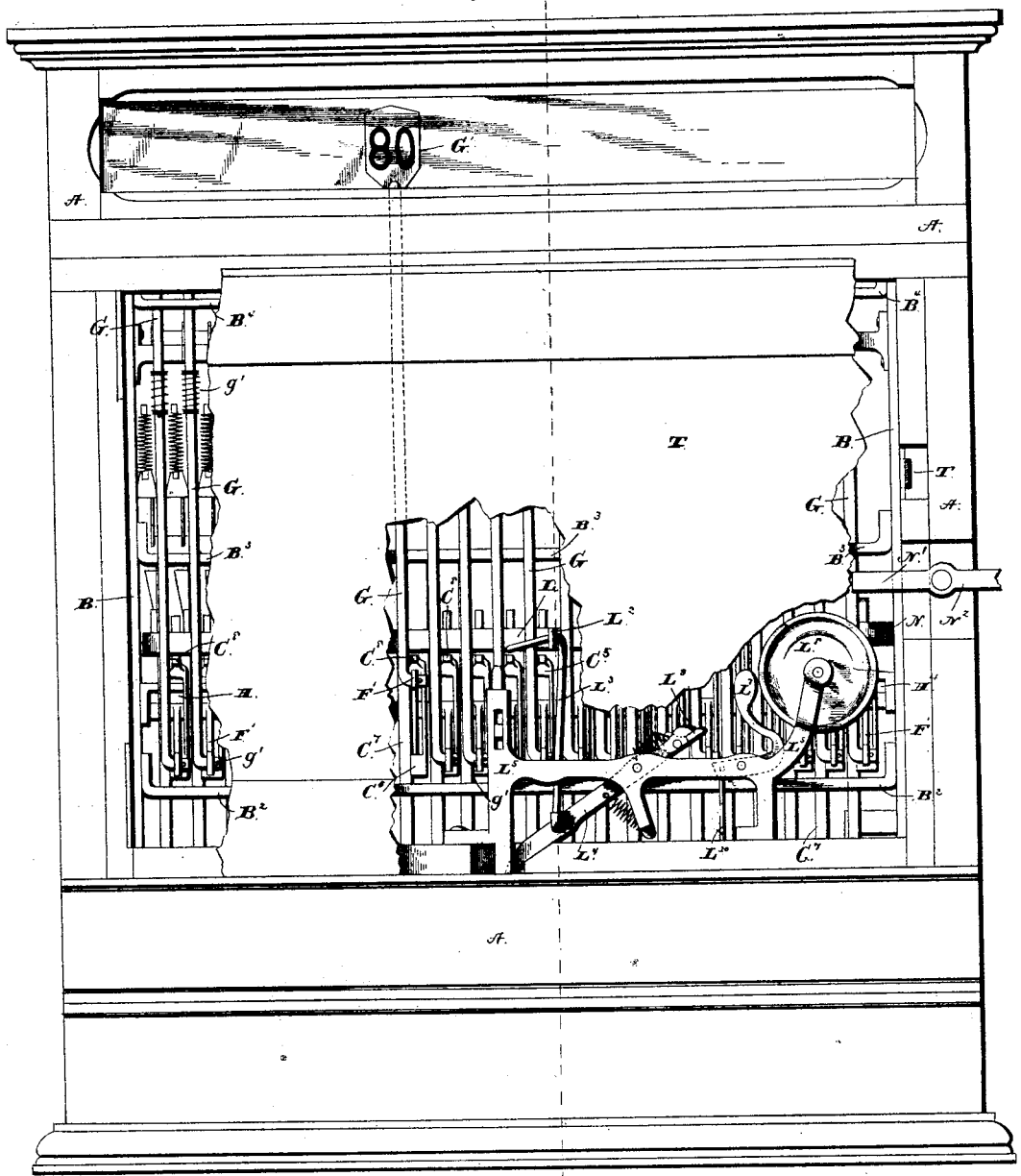
Figure 3:
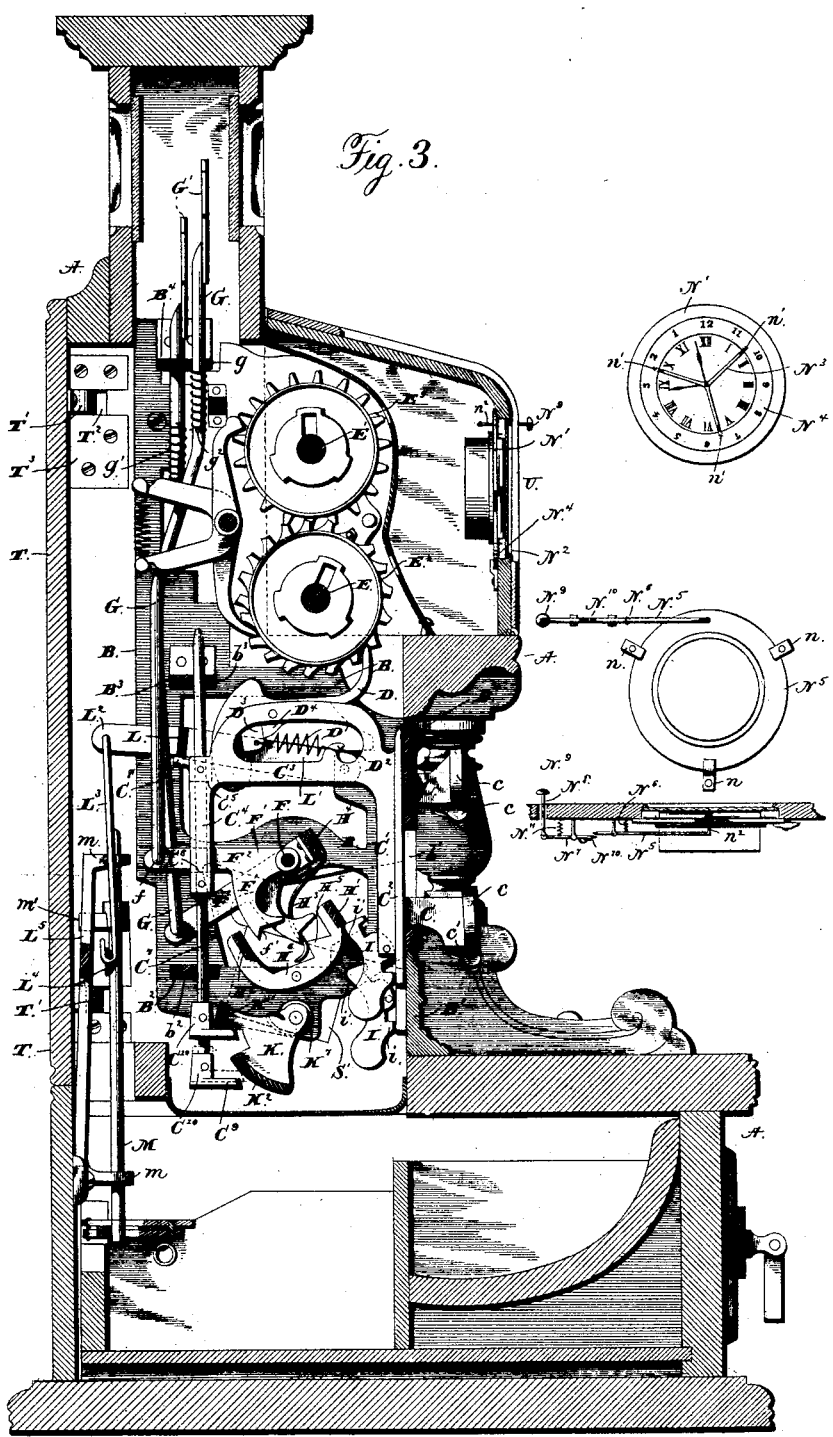
Figure 4:
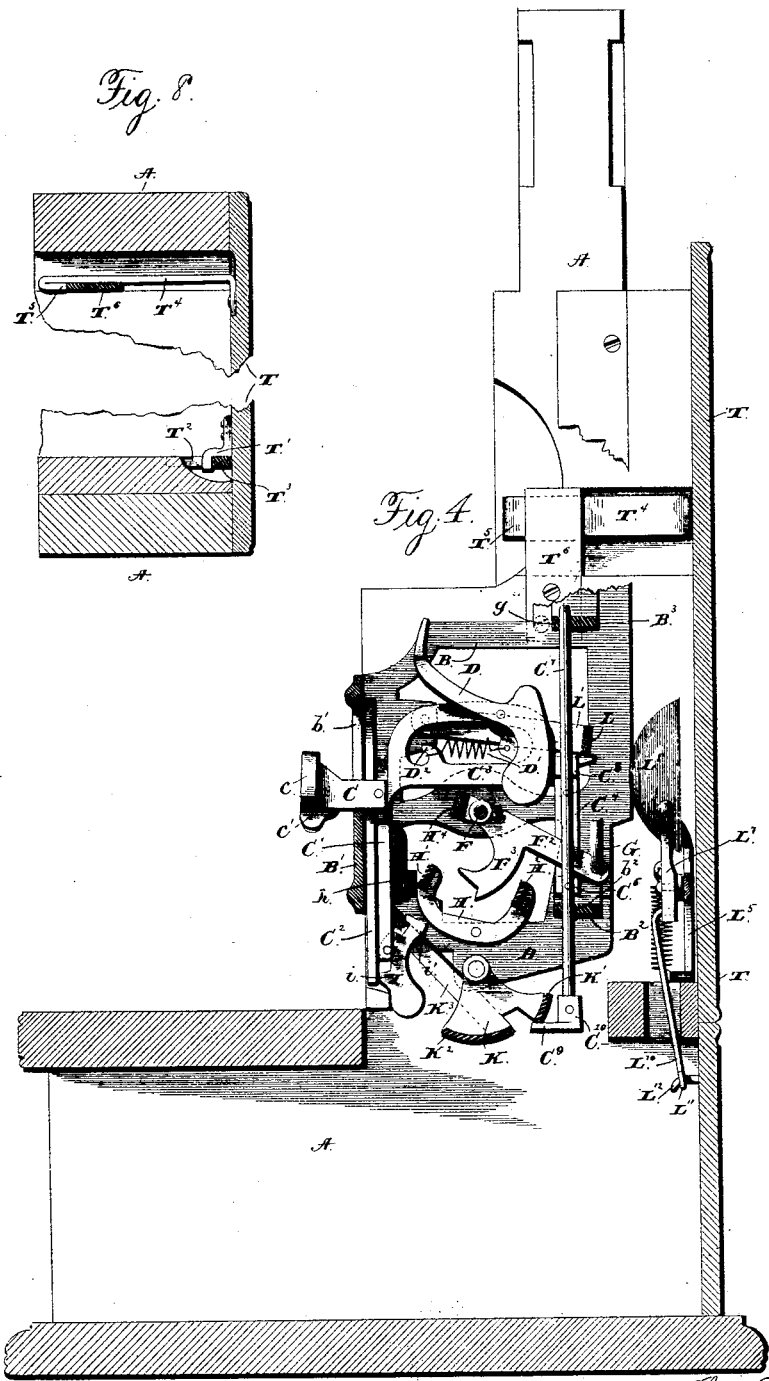
Figure 5:
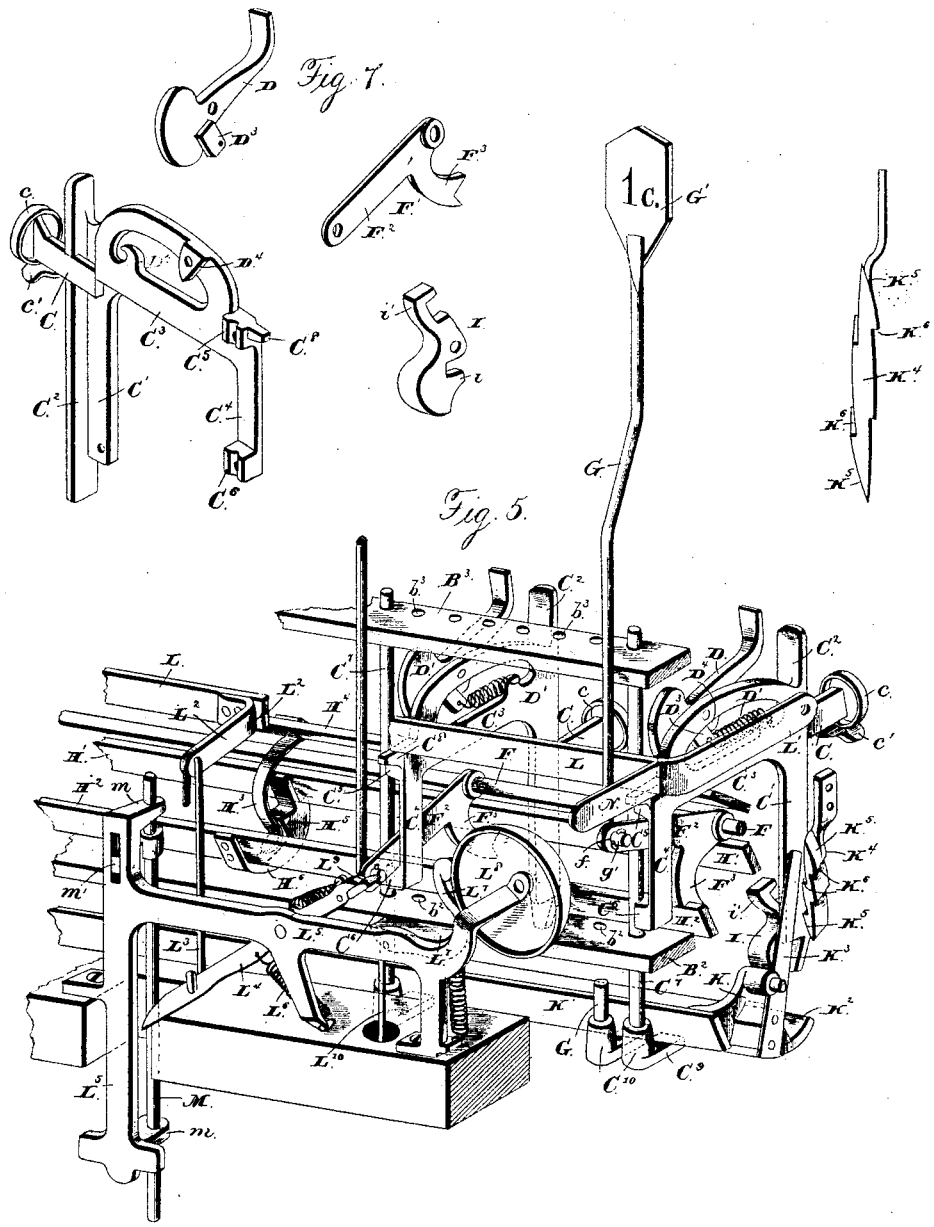
Figure 6:
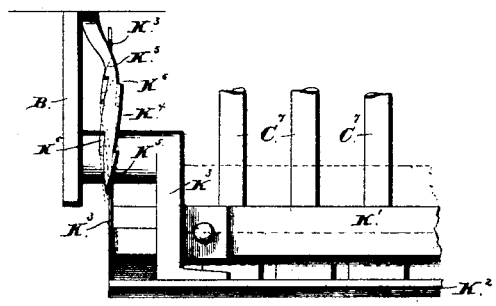
Figure 12:
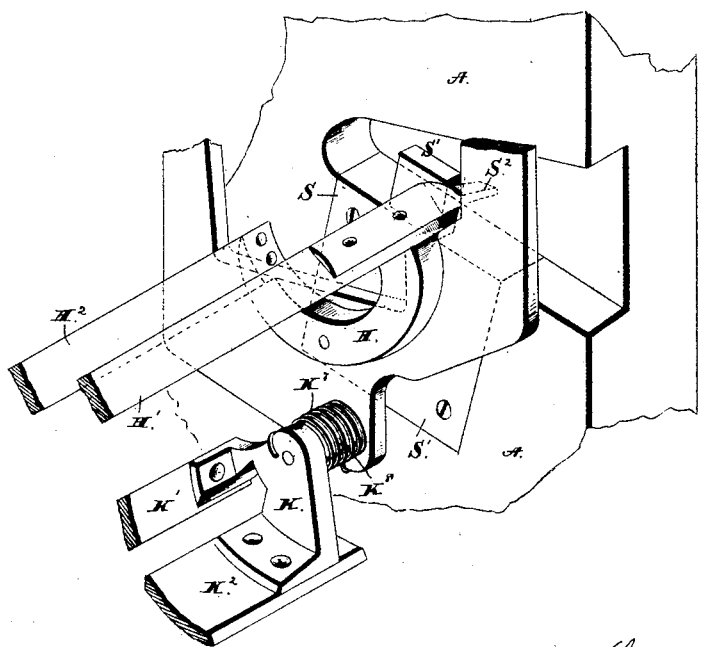

Figure 1 shows in perspective my cash indicator and register and money-changer arranged together as proposed by me; Fig. 2, a view of the indicator and registering mechanism in rear elevation, the back of the casing being removed; Fig. 3, a view of a vertical section on line $x$ $x$ of Fig. 2; Fig. 4, a view of a similar section of the same figure, but looking in the opposite direction, the registering-wheels being omitted and the parts being in their normal positions; Fig. 5, a detail rear perspective view of a portion of the registering and indicating mechanism; Fig. 6, a detail view of my key-arresting mechanism in end elevation; Fig. 7, a detail perspective view showing as separated from each other the various parts of one of my register and indicator keys, the pawls carried by such key, and the swinging indicator-rod, moving piece, or lever actuated by the key; Fig. 8, a detail horizontal sectional view showing the means for locking the back of the register and indicator mechanism in place; Fig. 9, a horizontal sectional view showing the connection of the registering and indicating mechanism with the locking devices for locking the levers or keys of the money-changer; Fig. 10, a vertical sectional view of the same; Fig. 11, a view of a section on line $z$ $z$ of Fig. 9; Fig. 12, a detail perspective view showing the means for locking the wing.

The object of my invention is to provide certain improvements in cash registering and indicating machines, and to so combine the mechanism of a machine of such class with that of a money-changer that the operative parts of the latter will remain normally locked against movement until the registering and indicating mechanism is operated to make a registration and indication, and then will be unlocked and in condition to be operated; and with these ends in view my invention consists in the register and indicator, in the construction, arrangement, and combination of the parts thereof, and in the combination of the mechanism of the register and indicator, with devices for locking and unlocking the operative parts of a money-changer.

In the drawings, A designates the machine-casing, which, as shown, is of substantially the same general shape and construction as that set forth and described in my United States Patent No. 384,691, dated June 19, 1888, with its raised indicator-tablet display-opening, its hinged lid or cover for the register-wheels, and its sliding cash-drawer.

The casing A of the money-changer apparatus to be used in connection with the register and indicator is preferably made, as shown, a continuation of the casing of the latter apparatus, so that both mechanisms will be inclosed in substantially one casing, though divided from each other by a partition-wall.

The money-changer, which is situated to the left of the cash registering and indicating mechanism, is, with the exception of the locking devices for the operative parts, that which is shown, described, and claimed in my United States Patent No. 339,986, dated April 13, 1886. Its construction and the arrangement and operation of its parts therefore need not be shown or set forth in detail herein.

For the full and complete description and illustration of the mechanism and manner of working the changer, I would refer to my money-changer patent just above noted.

The registering devices and means for setting them are the same as those fully described and shown in my hereinbefore-mentioned register and indicator, Patent No. 384,691, and therefore will not be described or specifically set forth in the present application.

Suitably supported and fastened within the part A of the casing is the frame of the registering and indicating mechanism. Such frame, shaped substantially like that shown in my said register and indicator patent, consists, essentially, of the two side or end plates B B, to be secured to the casing-walls by screws or other fastenings, connected together by the front plate B', slotted to admit the passage and movement of the keys to be hereinafter described, the two transverse bars B² B³ situated one above the other at or near the rear of the frame, and the upper bar B⁴ attached at its opposite ends to the side plates B B at or near their upper ends. This last-mentioned bar B⁴ is, like bars B² B³, situated at the rear of the frame.

The side plates, with the key or front plate and having bars connecting them, as described, form a strong rigid frame in which the operative parts of the mechanism are supported, so that they can be fully assembled within the frame before the latter is put in place in any desired form of casing.

The keys for operating the registering and indicating devices are, as shown in my said patent, No. 384,691, preferably arranged in two banks or rows, those in one bank or row being opposite the spaces between those in the other. Each key has the rigid portion C, passing rearward through the respective key-slot $b'$ in key-plate B' and bearing on its outer end a tablet or plate $c$, marked with the amount of cash to be registered or indicated upon movement of the key. Each key can also be provided on the under side of its outer end with a suitable finger piece or plate $c'$, so shaped as to be readily engaged by the finger used to actuate the key.

On the inner or rear end of the rigid portion C, just behind the key-plate B', is an upright rigid arm C'. Attached to and carried with said arm C' of each key is the upright guard-plate C², adapted to close the respective key-slot in whatever position the key may be, so as to effectually prevent any tampering with the mechanism by means of a wire or other device introduced through the slot. In order to secure the slot-closing action of the guard-plate, such plate must be wide enough to overlap both sides of the slot, and must extend above and below the portion C of the key enough to overlap the upper and lower slot ends, whether the key is raised or lowered. From the upper portion of the upright arm C' a rigid part C³ extends rearward to a point between the two bars B² B³. At the rear end of part C³ the key has a downwardly-extending arm C⁴, at one side of whose upper and lower ends are the side lugs C⁵ C⁶, respectively. Attached to the arm C⁴ is the upright rod C⁷, situated on the outer side of these lugs, so as to leave a space between it and the part C³ of the key.

In manufacturing my keys I contemplate making in one piece the upright arm C', the guard-plate C², and the horizontal rearwardly-extending part C³ and the dependent arm or piece C⁴ with its lugs. The finger-piece, carrying part C of the key, and the rod or bar C⁷ can then be separately made and attached to the rest of the key by screws, rivets, or other form of fastening. I do not, however, intend to limit myself to such manner or method of constructing the keys. If desired, the rear or inner end of each key could, obviously, be cast with a slot to correspond with the space shown in the drawings between the rod C⁷ and part C⁴ and lugs C⁵ and C⁶, and with projections above and below to take the place of the projecting ends of the rod. The rigid arm C, which extends forward through a key-slot in key-plate B', could also be made or cast in one piece with the rest of the key. The disks or tablets marked to indicate the various amounts to be registered, and indicated by moving the different keys, can then be made separate from and fastened to the arms C C of the respective keys.

At the rear or inner end of each key, and preferably situated at or near the upper end of part C⁴, is the rearwardly-extending lug or short arm C⁸, for a purpose to be set forth hereinafter.

The upright rods C⁷ C⁷, carried by the keys, have their upper and lower portions guided in suitable guide-openings $b^2$ $b^3$ in the upper and lower bars B² and B³, respectively, so that the movements of the rods, and consequently of the keys, must be parallel to the inner or rear face of the slotted front or key-plate B'. With the rods thus guided the guard-plates C² will be kept close against the plate B', so as to close the key-slots effectually, and the keys will be held in position, so that they can be moved up and down freely and without danger of binding.

On the lower end of each rod is a forwardly-extending toe C⁹, for a purpose which will appear hereinafter. As indicated in the drawings, such toe can be connected with the rod by means of a piece or foot C¹⁰, fastened on the rod end; but I contemplate, if desired, making it in one piece with or forming it of a pin passed through or attached to the rod. Where the foot-piece is used, it can be provided with a socket or opening to receive the rod end and be fastened in place by means of a rivet or pin. The toes C⁹ C⁹, carried by the rods of all the keys in both banks or rows, are to be so situated on their respective rods C⁷ that they will be in line with each other when the keys are driven in their normal positions.

With the toe-carrying feet C¹⁰ C¹⁰, made in the form of collars to receive and be fastened to the respective rods C⁷ C⁷, as indicated in the drawings, all of the keys for both banks can be made precisely alike or duplicates of each other, and the toe-carrying collars can be fixed on the rods at different heights, according as the key is to be upper or lower bank or row.

The horizontal rearwardly-extending parts C³ of all the keys stand in line with each other, or at the same height when the keys are down, and to them are pivoted the register-wheel-actuating pawls D, of substantially the same form, construction, and means of operation as the corresponding pawls shown and described in my said register and indicator patent. The spring D' for operating each pawl is a spiral one, at one end attached to the pawl at a point below the pivot thereof, and at the other end engaged by a hook-lug $D^2$ on the respective key. A shoulder $D^3$ on the pawl is adapted to strike a corresponding shoulder $D^4$ on the key, so as to limit the upward swing of the pawl under the stress of the pawl-spring.

Journaled upon the two shafts E E', extending across within the frame above the series of keys, are the two series of register-wheels $E^2$ and $E^3$, respectively, constructed and operating in the same manner as the corresponding register-wheels fully described and shown in my register and indicator patent referred to hereinbefore. The pawls D D on the keys are to engage and actuate the wheels $E^2$ as the keys are raised, just as in my patented machine.

I do not show or describe herein any form of setting mechanism for setting the series of wheels back to zero when desired, as the invention covered by the present case has nothing to do with such mechanism.

The registering devices to be operated by the movement of the keys and the means for setting such devices can be varied, as desired, without departure from my invention claimed herein.

Upon the rod F, extending across within the frame to the rear of the right arms C' C' and below the rearwardly-extending parts $C^3$ $C^3$ of the keys, and at its ends supported by the side frame-plates B B, are the elbow-levers F' F', one for each key. One arm $F^2$ of each of such levers extends rearward through the space between the arm $C^4$ of the respective key and the rod $C^7$, carried by the latter arm, so as to be in position to be engaged and swing upward by the lug $C^6$ as the key is raised.

Attached to the rearward end of each lever-arm $F^2$ is the lower end of an indicator-rod G, having its upper portion projecting up through a guide-opening $g$ in the transverse frame-bar $B^4$, and carrying on its upper end above such bar a suitable tablet or plate G', upon which is a mark or figure corresponding with that upon the plate on the front end or finger-piece of the respective key. The indicator-rod-guiding openings in bar $B^4$ are preferably arranged, as indicated, in two rows, one to the rear of the other, the openings throughout the whole series being alternately in the front and rear rows, those in one row being opposite the spaces between those in the other. This arrangement can, however, be changed, as desired, without departure from my present invention.

The form of connection between the lower ends of the indicator-rods and the lever-arms $F^2$ $F^2$ is preferably a pivotal one. As shown in the drawings, the lower end of each rod is bent to one side to form an arm $g'$ at a right angle to the rod, and passed through a hole $f$ in the respective lever-arm $F^2$. A pin passed through the end of arm $g'$ can then be employed to prevent such arm from becoming disengaged from the hole $f$.

Each lever F' has its other arm $F^3$ extending downward from its pivotal point, and, preferably, curved toward the front of the machine, as shown in the drawings in Figs. 3 and 4. In such arm near its lower end is a notch, whose rear side forms an abrupt shoulder $f'$ at substantially a right angle to the line of travel of the arm end as the lever swings on its pivot.

Pivoted at its ends in the frame side plates B B, below the pivotal support of the indicator-rod-actuating levers F' F', is a wing for locking any lever in raised position. Such wing I prefer to form as shown in the drawings.

Curved end pieces H H are pivoted to the side frame-plates B B at points between their upturned ends. Connecting the corresponding ends of these pieces are the bars H' $H^2$, forming the front and rear sides of the wing. The upper edge of bar $H^2$ is so situated that when one of the levers F' is raised to make a full indication it can be brought by swinging the wing directly under the shoulder $f'$ on the lever-arm $F^3$, so as to lock the lever as raised. The wing can be weighted so that it will swing automatically into lever-locking position when a lever has been raised; but I prefer to use a spring to hold the wing in such locking position. As shown in the drawings, this spring $H^3$, attached at its upper end to a bar $H^4$, supported at its ends in frame-plates B B, has its lower end in engagement with a lug $H^5$ on a piece $H^6$, connecting the bars H' $H^2$ at or about their middle points. The spring presses this lug toward the front of the machine, so as to swing the rear edge of the wing forward toward the curved rear sides of lever-arms $F^3$ $F^3$. The swing of the wing under stress of the spring is limited, so that the normal position of the bar $H^2$ will be close to the lever-arms when they are down. For so limiting the movement of the wing suitable stops or abutments can be arranged on the frame-plates B B in position to be engaged by the end pieces or either of bars H' $H^2$.

In Fig. 4 I show a stop $h$ adapted to be engaged by the forward end of one of the end pieces H of the wing. In Fig. 12 I show a stop-surface on the frame to be engaged by the end of the bar H'. Both or either of these forms of stops for limiting the movement of the wing under stress of the spring $H^4$ can be used, as desired.

With the wing and the levers F' F' arranged and constructed as shown and described, as any lever is swung up to raise its respective indicator-rod the arm $F^3$ on such lever will engage with its outer or rear curved side the bar $H^2$ of the wing and will force such bar rearward and downward thereby swinging the wing against the stress of spring $H^4$. The wing will remain thus swung back until the shoulder on the lever-arm comes above the level of the top of bar $H^2$, forming the edge of the wing. The spring will then quickly swing the wing so as to bring the bar $H^2$ below said shoulder into position to prevent the descent of the arm $F^3$ and lever $F'$ again. The lever will thus be locked in elevated position, with its tablet-bearing indicator-rod raised to make an indication, until the wing is tripped to release the shoulder $f'$ on the lever-arm. For so tripping the wing each key is provided with a pawl I, adapted to engage the forward bar $H'$ of the wing and raise the same as the key is raised to make a new registration and indication. Such pawl is preferably weighted, as shown, so as to hold it normally in position to engage the under side of bar $H'$ as it travels upward with the movement of its respective key. The wing-bar-engaging portion of the pawl is so situated that it does not strike such bar until it and its carrying-key have been moved upward a certain distance. The swing of the wing, as the pawl raises its bar $H'$, carries the latter upward and rearward, so that it passes off of the pawl before the key has reached the limit of its upward movement. The action of spring $H^3$ then quickly returns the wing, so that its rear bar $H^2$ bears against the rear side of the arm $F^3$ of the raised key in position to move quickly under the shoulder $f'$ when the latter is brought, by the movement of the lever-arm, above the bar edge. A portion $i$ of the pawl below its pivot serves, by coming in contact with a portion of the upright arm $C'$ of the respective key or the back of the guard-plate $C^2$, to act as a stop to hold the pawl against being swung upon its pivot while it is in engagement with the under side of bar $H'$. An incline $i'$ on the rear side of the upper end of each wing-tripping pawl, riding over the front face of the bar $H'$ as the pawl descends with the key, carrying it, swings the pawl upon its pivot until it passes below the front wing-bar again.

In order to insure complete registration and indication each time that a key or several keys together may be moved and to prevent any key being subsequently raised until any previously-moved ones have been fully raised and then returned to their normal positions, I provide what I term a "key-arrester." As shown, it consists essentially of the two pivotal arms K K pivoted to frame-plates B B below the lever-engaging wing and in front of the lower ends of the guide-rods $C^7$, carried by the keys, as hereinbefore set forth, and the two bars or plates $K'$ $K^2$, connecting said arms. The plate or bar $K'$ is situated in the path of the toes $C^9$ $C^9$ on the key-rods as the keys are raised, and normally rests upon such toes when all the keys and rods are down in their normal positions, as shown in Fig. 4. The second plate or bar $K^2$ of my arrester is curved on the arc of a circle struck from the axis of the swing of the pivotal arms K K and is situated nearer such axis than is the plate or bar $K'$, so that if the arrester be swung rearward toward the series of key-rods $C^7$ $C^7$ such plate $K^2$ will just clear the ends of the toes $C^9$ $C^9$ and will pass rearward and upward to a position over and close to the toe-tops. In this position, its curved under side will stand in the way of the upward travel of any of the toes below it.

Between the lower edge of bar or plate $K'$ and the rear edge of bar or plate $K^2$ there is space enough to allow the passage of the end of the toe being raised in engagement with the bar $K'$, so as to lift such bar and swing the arrester. As this bar is thus raised, the rear edge of the bar or plate $K^2$ is brought below the raised toe, so that the latter cannot be lowered again to its normal position without a downward movement of the bar or plate and consequent return swing of the arrester. Without such movement of the arrester, then, the raised toe and key connected therewith cannot be lowered and the unraised toes and connected keys cannot be raised.

To prevent the return movement of the arrester before it has reached the point to which it can be swung by the complete upward movement of the key and toe connected therewith, I provide it with a spring-arm $K^3$, preferably attached to one of the pivotal arms K and extending out therefrom in a direction substantially at right angles to the axis of motion of the arrester.

Attached to and supported from the contiguous frame-plate B, so that the arm $K^3$ can pass around it, is the ratchet-piece $K^4$, having its central line in the plane in which the arm $K^3$ would swing with the motion of the arrester if the ratchet-piece were not in its path. The opposite ends of this piece are provided with the opposite inclines $K^5$ $K^5$, crossing the path of the spring-arm, as shown in the drawings. Such inclines will as the spring-arm strikes them at the beginning of its travel in opposite directions guide and spring its end over, so that it will pass along one side of the piece as it moves in one direction and along the other side as it travels back again.

On the opposite sides of the piece $K^4$ are the oppositely-arranged ratchet teeth or notches $K^6$ $K^6$, those on either side having their abrupt faces turned in the direction of the travel of the spring-arm along that side, so as to engage the arm and prevent its backward movement along the side. As the spring-arm reaches the end of the piece in moving in any one direction, it snaps off the same into its normal position in the same plane with the medial line through the piece. This ratchet-piece is preferably of such length with reference to the full arc of swing of the portion of the arm which engages it that the arm snaps or springs off its ends just as the arrester reaches the ends of its swing, as a key is raised to its full amount and returned to its lowest normal position again. Obviously, instead of making the whole arm $K^3$ of spring material, its inner portion attached to the arrester can be made rigid and its outer end formed of a flat spring; or its arm or outer part could be pivoted, so as to be capable of swinging to one side or the other, with suitable springs tending to hold the arm or its swinging portion in a plane at right angles to the axis of motion of the arrester. Either of these forms of means for coacting with the ratchet-piece $K^4$ can be used without departure from my invention.

The arrester can be so formed that its own weight will tend to keep it normally in position, with its bar $K'$ resting upon the toes $C^9$ $C^9$ and its bar $K^2$ forward and out of the upward track of any of such toes as the respective keys may be raised. The weight of the arrester, as shown in the drawings, would thus tend to hold it in its lowest position; but I prefer to employ a spring $K^7$ for this purpose. Such spring, as shown in Fig. 12, is a spiral one surrounding the hub $K^8$, around the pivot at one end of the arrester. One end of this spring is attached to or engages a stationary part of the frame, while the other end engages the pivotal arm K of the wing.

For the purpose of causing the sounding of an alarm or signal each time that a full registration and indication is made by the raising of one key, or of several simultaneously, I provide each of the keys with a lug $C^8$, hereinbefore described, so situated that when the keys are down in their normal positions all the lugs will be in line. A swinging frame, consisting of the transverse bar L and the arms $L'$ $L'$ at the ends of such bar pivoted to the side frame-plates B B, is so situated that its bar is in the track of the lugs $C^8$ on the keys when any keys are raised, and rests upon all of such lugs when the keys are down. An arm $L^2$ extends rearward from the middle of the bar L, and passing between two of the indicator-tablet-carrying rods has its rear end connected with a rod $L^3$, whose lower end is in turn connected with the vertically-swinging lever $L^4$, pivoted to a supporting frame or standard $L^5$ attached to a suitable platform or bar within the casing. A spring $L^6$, attached at one end to the same arm of the lever with rod $L^3$ and at the other to the standard $L^5$, serves to draw down upon and hold said arm normally depressed. Pivoted also to frame or standard $L^5$ is the hammer-lever $L^7$ for striking the bell $L^8$, and connected with such lever is the usual form of spring for causing the lever to return and strike the bell when it has been moved from its normal position. The arm of this lever which does not carry the bell-striker is in the track of a spring-pawl $L^9$ on the end of lever $L^4$, which pawl is so formed as to stand rigid while in engagement with the top of the bell-lever arm as the pawl-carrying end of lever $L^4$ descends, and to yield and ride past the end of such arm as the pawl-carrying-lever end rises again. As the pawl moves downward it actuates the hammer-lever until it passes off of the end thereof, leaving the lever free to be swung by its spring.

As it is desirable sometimes to prevent the hammer-lever from striking the bell and render the apparatus quieter, so as not to call the attention of any one not immediately interested in the registration and indication, I contemplate providing means for either stopping the hammer-lever entirely or limiting its movement, so that it will not strike the bell. For this purpose the end of the hammer-lever arm can be provided with a rod $L^{10}$, hooked to the arm, as shown, or otherwise connected therewith. The lower portion of this rod extends down through an opening into the drawer-space in the lower part of the casing. Upon its lower end, situated at the rear side of the drawer-space and out of the way of the rear or inner end of the drawer, is a hook or ring $L^{11}$, adapted when the rod is drawn down to be placed in engagement with the head of screw $L^{12}$, or some hook or pin provided for that purpose on the rear wall of the drawer-space. With the rod drawn down and held by the engagement of its hook or loop with the catch therefor, as described, the hammer-lever will be securely held from operating to strike the bell. The hooked or looped end of the rod can be got at upon taking out the drawer.

For locking the drawer I use means like those shown and described in my patent, No. 384,691, hereinbefore referred to. There is the same vertically-reciprocating rod or bolt and the same latch device to act in conjunction with the bolt, all as fully set forth in said patent. The rod or bolt M is, however, in the present form of drawer locking and unlocking mechanism actuated in a different way and by different means. Instead of having the locking rod or bolt connected positively with a lever which is struck and actuated by the hammer-lever as the latter delivers a blow on the bell, I have such rod or bolt guided vertically in suitable guides $m$ $m$ on the standard or frame $L^5$, and provided with an arm $m'$ above and in the path of the end of the arm of lever $L^4$, which is connected with the rod $L^3$. The rod-arm $m'$ is so situated that it is engaged and raised by the rising arm of the lever $L^4$, so as to unlock the drawer just as the lever has moved to cause the alarm to be sounded. On the bar L of the swinging alarm-mechanism-actuating frame is an arm N, situated near the end of the frame toward the money-changer, which is at the left of the registering and indicating apparatus, as shown in the drawings and described hereinbefore. Pivoted to a suitable supporting-plate $N'$, on the casing division-wall between the register and indicator and money-changer, is the vertically-swinging lever $N^2$, one arm of which is situated above the arm N and in the track of the same, as the alarm-actuating-mechanism frame is swung up by the raising of one or more of the register and indicator keys. The other arm of the lever projects inward into the part of the casing occupied by the money-changer mechanism. Such mechanism is preferably in all respects, except the locking device for the coin-slide-actuating levers O O, the same as that shown and described in my money-changer patent, No. 339,986, hereinbefore referred to.

Instead of having the lever-locking wing or frame P adapted to engage the forward sides of the upper ends of the slide-levers, as set forth in such patent, I put such frame or wing in position to engage the rear sides of the lower portions of the levers, as shown in Figs. 10 and 11. The pivotal arms $p\ p$ of the locking-frame are pivoted to the rear of the series of levers, so that when the frame is down with its bar engaging the rear sides of the levers a rearward pressure of any one of the levers will not tend to cause an upward swing of the frame. Attached to this locking frame and extending rearward beyond the line between the frame-pivots is the rigid arm P', whose rear end comes just below the end of the lever $N^2$. With this construction, as the lever end is depressed it will force the rear end of arm P' down, so as to swing the lever-locking frame upward out of its locking position, so that the coin-slide-actuating levers will be free to swing. For retaining the frame as thus swung out of operative position until the money-changer mechanism has been operated to make change, I provide the swinging frame, consisting of the transverse bar R, extending across behind the series of levers below the locking-frame P, and the downwardly-extending pivotal arms R' R', pivoted at their lower ends to the casing or suitable plates thereon. A spring $R^2$, attached to one of these arms, tends to hold the bar R to the front toward the levers. Upon the upper side of this bar, at the rear edge thereof, is a lug $r$, adapted to rest against and engage the rear edge of the locking-frame when the latter is down in its normal locking position. The front edge of the bar R then stands just to the rear of the series of levers O O. As the locking-frame is swung up by the movement of the lever N engaging the frame-arm P', as described above, the bar R travels forward under stress of spring $R^2$, so as to bring its lug $r$ under the lever-engaging bar of the locking-frame. The latter frame will then be held up by the lug out of operative position. The front edge of the lug-carrying bar R now rests against the levers O O, so that as a lever is moved to make change the bar will be forced rearward to carry its lug out from under the bar of the locking-frame, again leaving such frame free to swing down to its normal locking position as the lever returns to its normal position.

For locking the register and indicator mechanism from being operated when it is desired that it should not be used, I provide on the end of the casing a lock S to be operated from the outside by a suitable key. The bolt S' of this lock, when shot, stands in the path of a lug $S^2$ on the end of the wing, which is employed to hold the indicator-rod-carrying levers in elevated position. With the wing thus locked from movement the keys will, by the engagement of their pawls I I with the bar II' of the wing, be also locked, so that the registering and indicating apparatus cannot be used until the lock-bolt is withdrawn from the path of lug $S^2$. As the money-changer mechanism remains locked, as set forth hereinbefore, until the register and indicator is operated, it follows that the one lock S can be used to secure both mechanisms from operation by unauthorized persons.

In order to prevent the mechanism within the casing from being got at from the rear, I do not fasten the casing back T on with nails or screws, but with suitable locking devices or catches, which can be moved to release the back only from the inside of the casing. The back of the whole casing, inclosing both the indicator and register and the money-changer mechanism, can be in one piece thus fastened in place, or the parts of the casing containing the two mechanisms can each have its back so secured. In the drawings, Figs. 3 and 8, I show the form of fastening which I prefer. At one end the casing back is provided on its inner face with two or more lugs T', adapted to engage recesses or slots $T^2$ in suitable plates $T^3$ on the casing ends. At its other end the back is provided with a forwardly-projecting spring arm or plate $T^4$, having a shoulder $T^5$, adapted to engage the forward edge of the upright plate $T^6$ on the casing. This spring arm or plate is so situated that with the hinged front lid or cover of the casing open its forward end can be reached with the finger and pressed so as to disengage its shoulder $T^5$ from plate $T^6$, leaving the casing back unlocked and free to be removed. With the lid locked it is obviously impossible to thus unfasten the casing back.

The weights of the tablet-carrying rods G G can be relied upon to swing each lever F' downward into its normal position when the supporting-wing is tripped; but I prefer to provide each rod with a small spiral spring $g$, adapted to engage the bar $B^4$ with its upper end when the rod is raised, and at its lower end resting upon a pin $g'$ on the rod. These springs will, with their downward pressure on the rod-pins, throw the rods and connected levers quickly down, when the latter are released by the locking-wing.

The operation of my apparatus and mechanisms, as shown and described, will be understood from the foregoing description, so that it need be but briefly set forth now. I shall describe the operation as when only one key is moved to make a registration and indication, as the action of the parts of the mechanism will be the same whether one key or two or more together be raised. As a key is raised by its finger-piece the lower lug $C^6$ on the piece $C^4$ at the rear end of the key engaging the rearwardly-projecting arm of the respective lever F', raises the same, swinging the lever so as to throw the tablet-carrying rod connected therewith upward. The toe at the lower end of the guide-rod on the key carries the bar K' of the key-arrester upward, causing the arrester to swing upon its pivots, so as to bring its bar or plate K² over the toes on the other key-guide rods in position to block their upward movement. The unraised keys are thus locked against movement until the arrester swings back to its normal position again. This, however, it cannot do, because of the engagement of its spring-arm with the ratchet-piece, until it has been swung upward to the limit of its swing by the complete movement of the key to make a full indication and registration. As the key and toe rise, swinging the arrester, the spring-arm of the latter rides up over the inclined faces of the successive ratchet-teeth on the ratchet-piece, snapping in behind the abrupt sides of the teeth as they are reached, so that return movement of the arm along that side of the piece and consequent backward swing of the arrester is effectually prevented. Meantime the partly-elevated toe and key cannot be dropped on account of the upper edge of the bar K² of the arrester standing below the toe. As the key is raised to its full extent, so as to make a complete registration and indication, the arrester is swung by the engaging key-toe, so that its spring-arm snaps off of the end of the ratchet-piece in position to return along the outer side of said piece. The arrester is now free to swing downward to its normal position, as the spring-arm can ride down over the inclined sides of the ratchet-teeth. Such teeth will, with their abrupt sides to engage the spring-arm upon attempted return upward movement of the same before it reaches the end of the piece toward which it is now traveling, effectually prevent a second raising of the key before it has been dropped to its lowest position again. The arrester then insures a complete movement of a key up and down and prevents any other key being subsequently raised until the first one has returned to its normal position. As the key begins to rise its pawl I, engaging the bar H' of the indicator-lever-locking wing, swings the latter, so as to trip it out from under the shoulder f' on any previously-raised lever. The weight of such lever and attached indicator-tablet-carrying rod and the stress of the spring on such rod will then quickly swing the lever downward to lower the indicator-tablet out of sight below the display-opening. As the key continues to rise, elevating its respective indicator-rod-actuating lever, the key-pawl rides off of the lower edge of the wing-bar H', and the spring H³ quickly swings the wing, so that its rear bar H² bears against the rear side of the downwardly-extending arm F³ of the lever. The rearward movement of such arm cams the wing back until the shoulder f' comes above the upper edge of bar H², when the wing, under stress of its spring, moves quickly into engagement with such shoulder, so as to lock the lever as raised, while the key is dropped to its normal position again. The key-pawl I does not move the wing as the key descends again, but rides easily over the bar H', swinging upon its pivot as it passes down. As the key is raised its lug C⁸, engaging the alarm-mechanism-actuating frame, raises the same. As the swinging frame reaches the limit of its upward movement with the key, it causes, through the connecting devices described, an alarm to be struck on the bell and the drawer-bolt to be tripped, so that the cash-receiving drawer remains unlocked, ready to be opened. As the alarm-actuating swinging frame approaches the upper end of its swing its arm N engages and actuates lever N², so that the money-changer-locking frame is raised to set the coin-slide levers free to be moved to make change. As this locking-frame is raised to release the slide-levers the frame R R' swings forward, as described hereinbefore, to bring its lug r under the bar of the locking-frame. The latter frame is thus retained in its elevated position out of engagement with the rear sides of the levers. As the money-changer is operated to make change, by the movement of one of its levers or several of them together, the frame R R' is struck and moved by such lever or levers, so as to carry its lug r rearward from under the bar of the lever-locking frame, which at once drops down into locking position behind the keys. With my arrangement of mechanism it will be observed that one alarm device serves to give warning when a full registration and indication is made, the cash-drawer of the registering and indicating apparatus is unlocked, and the money-changer is made ready for operation. There can be no partial registration and indication, such as would not cause sounding of the alarm, with a subsequent registration and indication by the operation of another key. Each registration and indication must be made full and complete with operation of the alarm mechanism before further use of the apparatus can be made.

For showing and recording the time when the clerk or other operator who is to use the apparatus arrives, I provide on the casing at U a time-check device, which can be of any of the ordinary and well-known forms of such devices. As shown in the drawings, it consists of a clock or time movement attached to the inner side of the hinged front or lid of the casing by means of clips or turn-buttons n n n, engaging a flange N' on the clock-case. To show the face of the clock, the lid or cover of the register-casing is provided with a glass-closed opening N². Attached to the hour-arbor of the time-movement is a spider N³, having upon the outer end of each arm a pin n'. An annular record-dial N⁴, preferably of paper or other material adapted to easily receive and retain the impression of a sharp point pressed against it, is attached to the spider so as to rotate therewith by means of the pins $n'$ $n'$ $n'$ on the spider, which engage holes in the record-dial. The numbering on the rotating record-dial runs in a direction opposite to that on the fixed clock-dial, and is so arranged that as the hour-hand points to any hour on the fixed dial the number on the record-dial corresponding to that hour will be opposite the recording point or marker used. The record-making device which I prefer to use, though I do not limit myself thereto, consists of the pivoted lever $N^5$ on the inner side of the casing-cover, provided with a marking or indenting point $n^2$. Such point is adapted to strike and indent the record-dial when brought in contact with it. A spring $N^6$ serves to hold the lever normally with its point just out of contact with the record-dial. When the lever has been swung to withdraw the lever-point farther from the dial and then released, the spring will cause the lever to deliver a blow upon the dial with its marking-point and then immediately move it to withdraw such point to its normal position.

To provide for operating the recording-lever from the outside of the register-casing, I have a lever $N^7$, pivoted on the inner side of such casing and connected with the push-rod $N^8$, projecting out through the casing front and having on its outer end a knob or button $N^9$. On the end of lever $N^7$ is a trip-pawl $N^{10}$, adapted to engage the end of record-lever $N^5$, so as to swing the latter to withdraw its recording-point from the record-dial as the lever $N^7$ is moved by the pushing in of rod $N^8$. As the pawl swings the record-lever and then passes off of its end such lever, under the stress of its spring $N^6$, delivers a quick blow upon the record-dial and then moves away therefrom, so as not to stop or hinder its movement. A spring $N^{11}$, acting like spring $N^6$, returns the trip-lever to its normal position as soon as the push-rod is released. As the lever returns to such position its pawl $N^{10}$ yields, so as to ride over and pass the end of the record-lever.

With the time-check mechanism, arranged as described and shown, the clerk or other operator can make record of the time when he arrives or departs by pressing in the push-button at such time or times.

The record-dial can easily be reached, examined, and changed by the proper person having the key to the casing. He can unlock the lid or hinged front, and, upon swinging it down, can, by turning clips $n$ $n$ $n$, release the time-movement. He can then easily take the record-dial off of the spider-arms and replace it with another, as desired.

Having thus described my invention, what I claim is—

1. In combination with a series of movable indicating devices and keys for moving the same, a lock for engaging and retaining any of the devices moved into the indicating position, and a separate tripping device carried by each of the keys for tripping such lock, substantially as and for the purpose specified.

2. In combination with the swinging wing and the series of indicating devices adapted to be engaged and retained by the wing as moved into indicating position, the keys for actuating the indicating devices, and means carried by the keys for tripping the wing, substantially as and for the purpose shown.

3. In combination with the swinging wing and the series of indicating devices adapted to be engaged and retained by the wing as moved into indicating position, the keys for moving such devices and a pawl on each key for tripping the wing, substantially as and for the purpose set forth.

4. In combination with the series of levers provided with shoulders, the locking-wing, the lever-actuating keys, and means carried by the keys for tripping the wing, substantially as and for the purpose described.

5. In combination with the swinging wing, the series of levers, each provided with a wing-engaging shoulder and connected with suitable display devices, the keys for actuating the levers, and the pawls on the keys for tripping the wing, substantially as and for the purpose specified.

6. In combination with the series of tablet-carrying rods and the levers connected therewith, each provided with a shoulder, the wing adapted to engage the shoulder on any raised lever to retain it in elevated position, the lever-actuating keys, and a pawl on each key to engage and trip the wing, substantially as and for the purpose shown.

7. In combination with the series of levers carrying the tablet-rods and each provided with a shoulder, the spring-pressed wing for engaging the shoulder of any raised lever so as to retain it in elevated position, the series of keys for raising the levers, and the series of pawls, one carried by each key, adapted to engage and trip the wing to release any raised lever before the respective key reaches the limit of its upward movement, substantially as and for the purpose set forth.

8. In combination with the series of levers, each provided with a shoulder, the indicator-rods connected therewith, each having a spring tending to force it down when elevated, the lever-locking wing adapted to engage the shoulder on any lever swung to raise its indicator-rod, the series of keys for raising the levers, and pawls on the keys adapted to trip the wing as a key is raised and allow it to return to its normal position before the key reaches the limit of its upward motion, substantially as and for the purpose described.

9. In combination with the series of levers connected with suitable display-tablet-carrying devices and each provided with a shoulder, the locking-wing for engaging the shoulder of any raised lever, a spring tending to swing and hold the wing in locking position, and the series of lever-raising keys, each having a pawl adapted to engage the wing as the key is raised and pass out of engagement therewith before the key is raised to its full extent, substantially as and for the purpose specified.

10. In combination with the series of levers, each having an arm connected with an indicator-tablet-carrying device and an arm provided with a shoulder, the spring-pressed wing, the series of keys, each adapted to engage and raise one of the levers as the key is raised, and the weighted pawls on the keys, each adapted to engage the wing positively and then ride off of the same during the upward movement of the key and to yield and pass the wing without operating the same on the downward movement of the key, substantially as and for the purpose shown.

11. In combination with the series of levers, each having the arm connected with a display-tablet carrier, and the downwardly-extending arm provided with a shoulder on its lower end, the locking-wing having its edge normally in the path of the end of the shouldered arm as the lever is swung to move the tablet-carrier into indicating position, a spring for retaining the wing in its normal position, the keys, each adapted to move one of the levers, the weighted pawls on the keys, and the bar on the forward side of the wing adapted to stand in the path of the pawls while the wing is in its normal position, substantially as and for the purpose set forth.

12. In combination with the series of reciprocating keys, carrying with them toes or projections, a key-arrester having a bar standing across the series of toes and in the path thereof as they move with their respective keys, and a second bar or plate adapted to be brought by the movement of the arrester below any moved toe and above all the unmoved ones, so as to lock the latter, substantially as and for the purpose specified.

13. In combination with the reciprocating keys and the toes moving therewith, the movable key-arrester having a bar extending across in the path of such toes, so as to be moved by any one of them, and the second bar adapted to be brought by the movement of the arrester behind any moved toe, and means for preventing return motion of the arrester until it has moved a certain predetermined distance, substantially as and for the purpose shown.

14. In combination with the keys and the toes or projections moving therewith, the movable arrester having a bar extending across the series of toes, so as to be actuated by any one of them, and a second bar adapted to be brought by the motion of the arrester below any moved toe and above the unmoved ones, a spring-arm carried by the arrester, and a ratchet-piece having ratchet-teeth engaged by the spring-arm, substantially as and for the purpose set forth.

15. In combination with the series of reciprocating keys and the toes or projections moving therewith, the swinging arrester having the bar extending across the upper sides of the toes, and the second bar or plate adapted to be brought by the swing of the arrester over any unraised toe and having its under side adapted to block the path of the unraised toes, substantially as and for the purpose described.

16. In combination with the series of reciprocating keys and the toes connected therewith so as to travel with them, the swinging arrester having the bar standing in the path of the toes so as to be moved by any toe raised, and the second bar adapted to be brought under the raised toe and over the unraised ones, shaped so as to prevent the latter from being raised, a spring-arm carried by the arrester, and the ratchet-piece having oppositely-arranged ratchet-teeth on its opposite sides and oppositely-inclined guiding-surfaces at its opposite ends, substantially as and for the purpose specified.

17. In combination with the series of keys and the guide-rods thereon, the toes on such rods, the swinging arrester having the bar extending across over the series of toes and in the path thereof as the keys are moved, and the bar or plate standing out of the path of the toes when the arrester is down in its normal position adapted to be brought into the path of the toes by swinging of the arrester and to block the path of any unraised toes, a spring tending to hold the arrester in its normal position, the spring-arm carried by the arrester, and the ratchet-piece adapted to prevent return of the arm after only partial movement of the same, substantially as and for the purpose shown.

18. In combination with the series of indicating devices and a lock for retaining any of them as moved into indicating position, the series of keys for actuating the indicating devices, separate means carried by each of the keys for tripping such lock, and a key-arrester adapted to prevent the return of a key only partially moved, substantially as and for the purpose set forth.

19. In combination with the series of indicating devices and the wing for locking any of them as moved into indicating position, the series of keys for actuating the indicating devices, each provided with means for tripping the wing before the key has completed its movement to actuate its respective indicating device, and a key-arrester to prevent return of the key after only partial movement, substantially as and for the purpose described.

20. In combination with the series of levers carrying display devices and provided with shoulders, the shoulder-engaging wing, the keys for raising the levers, the toes or projections carried with the keys, the arrester having the bar situated in the upward path of such toes, and the bar or plate adapted to be brought by the motion of the arrester over any unraised toes and below any raised ones, and means for preventing return movement of the wing until it has been moved a certain predetermined distance by the full travel of the raised key or keys, substantially as and for the purpose specified.

21. In a register and indicator, the bell-striking device, and means contained within the casing for preventing such device from striking the bell when desired, substantially as and for the purpose shown.

22. In a register and indicator, in combination with the bell-striking lever for sounding an alarm as the apparatus is used, a rod connected with such lever and projecting down into the drawer-space within the apparatus casing, a catch within such space, and a hook or loop on the rod to engage the catch so as to hold the rod down and the lever out of bell-striking position, substantially as and for the purpose described.

23. In a register and indicator, in combination with the swinging frame for actuating the alarm mechanism as any key is moved, the lever for tripping the bell-striker connected with such frame, and the bolt of the drawer-locking device having a lug or shoulder adapted to be struck by such lever just as its movement causes an alarm to be struck, substantially as and for the purpose specified.

24. In combination with the alarm-sounding mechanism of a register and indicator adapted to be operated to sound an alarm as an indication and registration is made, a money-changer apparatus, a lock for preventing movement of the operative parts thereof, and connections between such lock and the alarm-sounding mechanism so that the lock is tripped to release the parts of the money-changer as an indication is made and an alarm is sounded, substantially as and for the purpose set forth.

25. In combination with the swinging frame for actuating the alarm-sounding devices of a register and indicator, and the lock for preventing movement of the operative parts, of a money-changer mechanism, connections between such lock and the frame, whereby the former is tripped as the latter is moved to cause an alarm to be sounded, substantially as and for the purpose described.

26. In combination with the movable frame and the alarm-sounding devices connected therewith, a money-changer apparatus having a lock for preventing movement of the operative parts of the mechanism, and a lever connection between the movable frame and lock for tripping the latter as the former is moved to operate the alarm-sounding devices, substantially as and for the purpose specified.

27. In combination with the swinging frame and the alarm-sounding devices connected therewith, an arm on the frame, a lever adapted to be engaged by such arm as the frame moves to cause an alarm to be sounded, a money-changer mechanism, and a lock for preventing movement of the operative parts of such mechanism adapted to be moved by the frame-actuated lever, substantially as and for the purpose shown.

28. In combination with the swinging frame connected with alarm-sounding devices, the money-changer mechanism, a swinging frame adapted to engage and lock the parts of such mechanism from movement, arms on the two frames, and a lever to engage such arms, substantially as and for the purpose set forth.

29. In combination with a registering and indicating apparatus having the swinging frame adapted to be moved as an indication and registration is being made, and an alarm mechanism operated by the frame, a money-changer having a swinging lock-frame to hold its operative parts from movement, an arm on such frame, a lever to engage the same, and an arm on the alarm-mechanism-actuating frame to strike the other end of the lever, substantially as and for the purpose described.

30. In combination with the swinging frame and the connected alarm-sounding mechanism, the coin-slide-operating levers of a money-changer, the swinging locking-frame having a bar to engage and lock the levers from movement, spring-actuated frame having a portion adapted to come under and support the locking-frame bar when the latter is raised out of operative position, and means whereby as the alarm-mechanism-actuating frame is moved to cause sounding of the alarm the lever-locking frame is moved out of engagement with the levers, substantially as and for the purpose specified.

31. In combination with the coin-slide-actuating levers of a money-changer, the swinging locking-frame having a bar to engage and lock the levers, the swinging pawl-frame having the lug to come under and support the locking-frame bar when the same is raised out of operative locking position, and the bar adapted to be engaged by any moved lever, so as to actuate the frame to carry its lug out from under the locking-frame bar, a spring tending to swing the pawl-frame toward the levers, and a movable piece for swinging the locking-frame up into inoperative position adapted to be actuated by means outside of the money-changing mechanism, substantially as and for the purpose shown.

32. In combination with the alarm-mechanism-actuating frame, the coin-slide-actuating levers of a money-changer, the locking-frame having the bar to engage and lock the levers from operation, the pawl-frame having the bar extending across the series of levers and the lug to be brought by the swing of the frame under the bar of the locking-frame when the latter has been moved out of operative position, the spring for so swinging the pawl-frame, an arm on the locking-frame, the lever for engaging such arm, and a lug or arm on the alarm-mechanism-actuating frame for engaging such lever, substantially as and for the purpose set forth.

In testimony that I claim the foregoing I have hereunto set my hand this 20th day of November, A. D. 1888.

CABEL B. HOPKINS.

Witnesses:
JOSEPH ERB,
WM. T. HALE.